(12) United States Patent
Farrell et al.

(10) Patent No.: US 9,164,911 B2
(45) Date of Patent: *Oct. 20, 2015

(54) ATOMIC EXECUTION OVER ACCESSES TO MULTIPLE MEMORY LOCATIONS IN A MULTIPROCESSOR SYSTEM

(71) Applicant: International Business Machines Corporation, Armonk, NY (US)

(72) Inventors: Mark S. Farrell, Pleasant Valley, NY (US); Jonathan T. Hsieh, Manchester, CT (US); Christian Jacobi, Poughkeepsie, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/315,670

(22) Filed: Jun. 26, 2014

(65) Prior Publication Data

US 2014/0310475 A1    Oct. 16, 2014

Related U.S. Application Data

(63) Continuation of application No. 12/786,787, filed on May 25, 2010, now Pat. No. 8,799,583.

(51) Int. Cl.
*G06F 12/08* (2006.01)
*G06F 9/52* (2006.01)
*G06F 9/30* (2006.01)
*G06F 9/38* (2006.01)

(52) U.S. Cl.
CPC .......... *G06F 12/084* (2013.01); *G06F 9/30043* (2013.01); *G06F 9/30072* (2013.01); *G06F 9/3834* (2013.01); *G06F 9/528* (2013.01); *G06F 12/0815* (2013.01); *G06F 2212/62* (2013.01)

(58) Field of Classification Search
CPC ....... G06F 12/084; G06F 12/08; G06F 9/528; G06F 9/30043; G06F 9/30072; G06F 9/3834; G06F 12/0815; G06F 2212/62
USPC .................. 711/119, 120, 121, 122, 124, 141
See application file for complete search history.

(56) References Cited

U.S. PATENT DOCUMENTS

| 4,442,487 A | 4/1984 | Fletcher et al. ............... 711/122 |
| 5,193,167 A | 3/1993 | Sites et al. |
| 5,428,761 A | 6/1995 | Herlihy et al. |

(Continued)

*Primary Examiner* — Jared Rutz
*Assistant Examiner* — Mehdi Namazi
(74) *Attorney, Agent, or Firm* — Fleit Gibbons Gutman Bongini & Bianco PL; Jeffrey Giunta (57) ABSTRACT

A method and central processing unit supporting atomic access of shared data by a sequence of memory access operations. A processor status flag is reset. A processor executes, subsequent to the setting of the processor status flag, a sequence of program instructions with instructions accessing a subset of shared data contained within its local cache. During execution of the sequence of program instructions and in response to a modification by another processor of the subset of shared data, the processor status flag is set. Subsequent to the executing the sequence of program instructions and based upon the state of the processor status flag, either a first program processing or a second program processing is executed. In some examples the first program processing includes storing results data into the local cache and the second program processing includes discarding the results data.

20 Claims, 5 Drawing Sheets

(56) References Cited

U.S. PATENT DOCUMENTS

| | | | |
|---|---|---|---|
| 5,742,785 A | 4/1998 | Stone et al. | 712/217 |
| 5,922,057 A | 7/1999 | Holt | 710/52 |
| 6,073,211 A | 6/2000 | Cheng et al. | 711/122 |
| 6,490,660 B1 | 12/2002 | Gilda et al. | 711/141 |
| 6,976,131 B2 | 12/2005 | Pentkovski et al. | 711/146 |
| 7,480,771 B2 | 1/2009 | Moir et al. | |

ATOMIC EXECUTION OVER ACCESSES TO MULTIPLE MEMORY LOCATIONS IN A MULTIPROCESSOR SYSTEM

CROSS-REFERENCE TO RELATED APPLICATIONS

The present patent application is a continuation of and claims priority from U.S. patent application Ser. No. 12/786,787 filed on May 25, 2010, now U.S. Pat. No. 8,799,583, the disclosure of which is hereby incorporated by reference in its entirety.

FIELD OF THE INVENTION

The present invention generally relates to memory management in multiple processor computing systems, and more particularly relates to determining consistent memory contents during execution of a sequence of processing instructions in a multiple processor system.

BACKGROUND OF THE INVENTION

Processors in modern multiprocessor systems commonly share data contained in shared data storage that is accessed and modified by all of the processors in the multiprocessor system. Many computer programs include a sequence of operations that require shared data storage to be accessed atomically from the perspective of each accessing processor. Atomic access of data refers to a condition where a sequence of instructions that begins reading and/or modifying a set of shared data is able to access that set of shared data without another processor reading and/or modifying that set of shared data until the first processor is done with the processing of that data.

Several conventional techniques are used to limit access to shared data storage. One technique is referred to as a lock. A lock mechanism allows one processor to read and/or modify shared data. Locks are usually implemented by Compare-and-swap (CAS) or similar instructions. Lock mechanisms, however, block other processes during the shared memory access and thereby impact processing performance, limit efficient scaling, and possibly leading to a processing deadlock by two processors that are trying to simultaneously access common sets of data.

Transactional memory is another method of limiting access to shared memory. A transaction consists of a sequence of instructions that store data to private storage and that end with a commit instruction if the transaction is successful. Each storage location that is read or modified by the transaction is marked and if any marked storage locations are modified by another processor, the transaction aborts. If the transaction does not abort, the commit instruction copies all of the modifications in private storage into the shared data. Transactional memory, however, limits processing to accessing data able to be stored in the often limited private storage and adds processing overhead associated with maintaining the marking data for each memory location.

Access to shared memory is also controlled by a load-linked (LL) and store-conditional (SC) pair of instructions. The LL reads a shared data storage location and the SC writes a new value into that same storage location. Any updates to the storage location between the LL and SC causes the SC to fail and thereby not modify the storage location. LL and SC memory access controls exhibit limitations similar to those discussed above for lock mechanisms.

Therefore, the accessing shared memory by multiple processor computing systems is able to be improved by a more efficient shared memory control mechanism.

SUMMARY OF THE INVENTION

In one embodiment, a method for performing a sequence of memory access operations on a processor accessing shared data within a multiple processor system includes setting a flag into a first state and then executing, by a first processor, a sequence of program instructions that includes at least one instruction accessing selected data elements within a local cache of the first processor. The local cache stores a subset of shared data accessed by multiple processors. The method further includes setting, during the execution of the sequence of program instructions and in response to a modification by a second processor of the subset of shared data, the flag into a second state. The method further includes, subsequent to the executing the sequence of program instructions and in response to the flag being in the first state, outputting a control to select execution of a first program.

In another embodiment, a central processing unit within a multiple processor system sharing a shared memory and performing a sequence of memory access operations includes a processor status flag settable between a first state and a second state and a local cache for storing a subset of shared data accessed by multiple processors. The central processing unit further includes a processor configured to set the processor status flag into the first state and to execute, subsequently to the setting the processor status flag, a sequence of program instructions that includes at least one instruction accessing selected data elements within the local cache. The processor is further configured to set, while executing the sequence of program instructions and in response to determining a modification by a remote processor of shared data corresponding to data stored within the local cache, the processor status flag into a second state. The processor is also configured to, subsequent to executing the sequence of program instructions and in response to the processor status flag being in the first state, output a control to select execution of a first program.

In another embodiment, a computer program product for performing a sequence of memory access operations on a processor sharing a shared memory system within a multiple processor system includes a computer readable storage medium having computer readable program code embodied therewith. The computer readable program code includes computer readable program code configured to set a flag into a first state and computer readable program code configured to execute, by a first processor subsequent to the setting the flag, a sequence of program instructions that includes at least one instruction accessing selected data elements within a local cache of the first processor. The local cache stores a subset of shared data accessed by multiple processors. The computer readable program code also includes computer readable program code configured to set, during execution of the sequence of program instructions and in response to a modification by a second processor of the subset of shared data, the flag into a second state. The computer readable program code further includes computer readable program code configured to, subsequent to executing the sequence of program instructions and in response to the flag being in the first state, output a control to select execution of a first program.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

In the following discussion, a sequence of program instructions is described as being executed "atomically" when that sequence of program instructions accesses shared memory while ensuring that the accessed contents of that shared memory were not modified during execution of that sequence of program instructions.

The systems and methods described below operate to determine if a sequence of processing instructions are accessing shared data that remains consistent for the duration of the execution of the sequence. The shared data accessed by the sequence of processing instructions may also be accessed, and potentially modified, by any of the multiple processors in a multiple processor system. In an example, a processor status flag is maintained by a processor and is set whenever data accessed by an executing sequence of program instructions may have been modified by another processor. In operation, this processor status flag is reset before starting execution of an arbitrarily long sequence of program instructions. The program instructions within the sequence of program instructions access shared data but generally do not commit changes to shared data. At the end of the execution of that sequence of program instructions, the processor checks the state of the processor status flag. If the processor status flag has not been set, the sequence has effectively executed atomically and the accessed data was not changed during the execution of that sequence of program instructions. Any results produced by that sequence of instructions can then be stored into shared data storage. If the flag has been set, the sequence's atomicity may have been be compromised and results of the sequence of program instructions are not committed to the shared data storage. In one example, any results produced by the sequence of program instructions are discarded and the sequence of program instructions is re-executed if the flag was determined to have been set.

Various processing instructions are used to access the processor status flag to control program execution based upon the state of the processor status flag. A sequence of processing instructions begins by resetting the processor status flag to the "no modification" (0) state by executing a millicode execution control instruction. Upon completion of the sequence of program instructions, a move character special instruction inspects the state of the processor status flag. If the processor status flag is in the "no-modification" (0) state, the move character special instruction stores the results into the shared data storage and sets a condition code into a state indicating successful completion. If the processor status flag is in the "modified" (1) state upon completion of the sequence of program instructions, the move-character special instruction is configured to not modify shared data and to set a condition code into a state indicating the unsuccessful execution.

A suitable instruction, such as a branch relative on condition instruction, is able to inspect the condition code set by the move-character special instruction and branch to different processing instructions based upon the state of that condition code. In an example, if the condition code is set to indicate that the shared memory was modified during execution of the sequence of program instructions, the branch relative on condition instruction branches to repeat execution of the sequence of program instructions.

In another example, the sequence of program instructions does not include instructions to modify shared data. When the sequence of program instructions does not have instructions to modify shared data, a branch relative special instruction inspects the state of the processor status flag and branches to different instruction sequences depending on the state of the processor status flag.

The processor status flag is maintained by monitoring receipt of invalidation requests from other processors and also by monitoring cast-outs from the processor's local cache. If local copies of any shared data storage locations are lost, then those shared data storage location may be modified by another processor and the flag is set to the 1 state.

Figure 1:
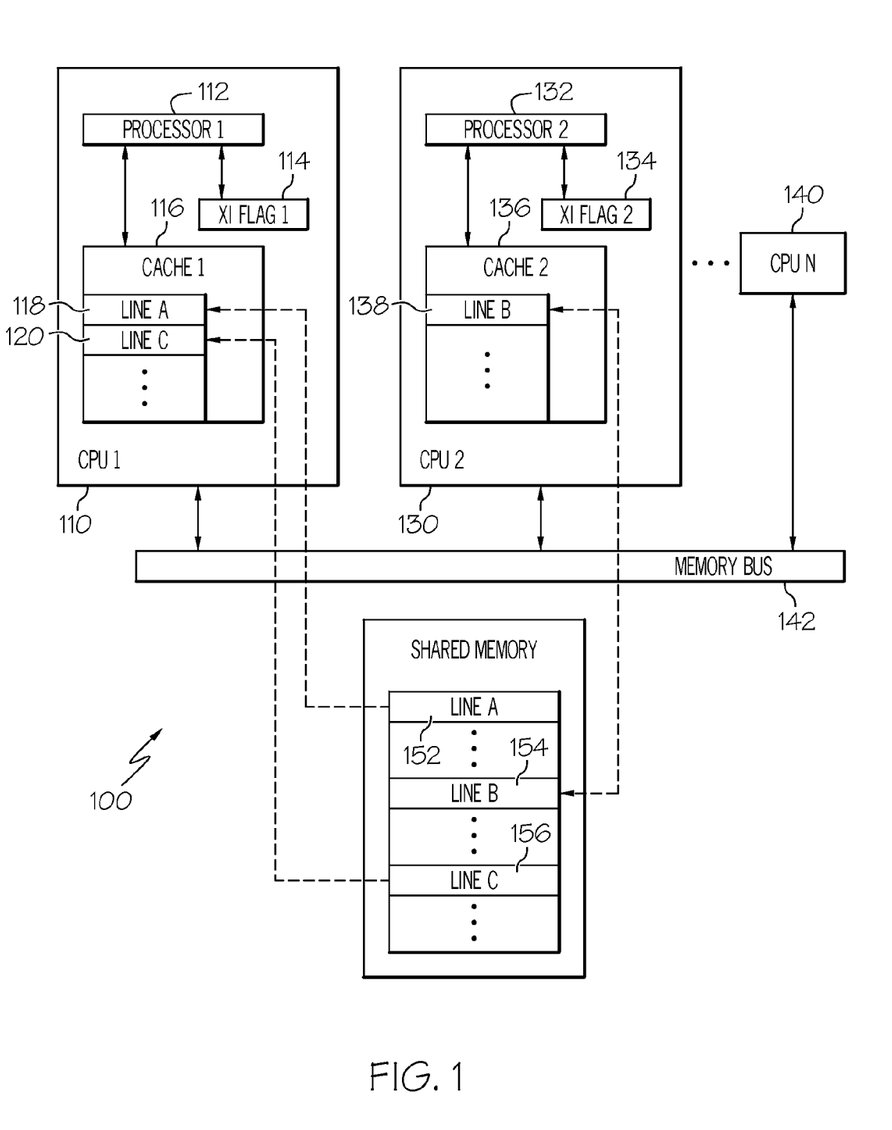
FIG. 1 is a block diagram illustrating a shared memory multiple processor system, in accordance with one embodiment.

FIG. 1 is a block diagram illustrating a shared memory multiple processor system 100 according to one embodiment of the present invention. The shared memory multiple processor system 100 includes a number of central processing units, or CPUs, such as CPU 1 110, CPU 2 130, and CPU N 140. All of the CPUs of the shared memory multiple processor system 100 access a shared memory 150 over a memory bus 142. Each CPU has an associated local cache, which is indicated for CPU 1 110 as a cache 1 116 and for CPU 2 130 as cache 2 136. Each CPU further has an associated processor, which is indicated for CPU 1 110 as a processor 1 112 and for CPU 2 130 as processor 2 132. Each of the processors in the multiple CPUs accesses shared data stored in the shared memory 150.

As is understood by practitioners of ordinary skill in the relevant arts in light of the present discussion, a local cache such as a cache 1 116 stores a copy of a subset of the shared data contained in shared memory 150 that is able to be rapidly accessed by the processor of its associated CPU, such as processor 1 112 in CPU 1 110. In a shared memory system such as is illustrated, the processor associated with a local cache is able to perform processing that repeatedly accesses shared data stored in the local cache if the corresponding shared data within the shared memory 150 has not been changed during that processing. In general, data that is repeatedly manipulated by only one processor is often able to be rapidly and directly accessed by that processor in its local cache without incurring the processing overhead of accessing shared memory 150.

Cache memory, such as cache 1 116, is often organized to store shared data as "lines" of cached data. As is understood by practitioners of ordinary skill in the relevant arts in light of the present discussion, data is often organized in a CPU's local cache memory into fixed sized data blocks, referred to as "lines," that are copies of shared data stored in shared memory 150. In the illustrated example, CPU 1 110 is shown to have a cache 1 116 that contains two (2) cache lines of data corresponding to shared data stored in the shared memory 150. Cache 1 116 is shown to contain a cached line A 118 and a cached line C 120. The cached line A 118 is stored in cache 1 116 of CPU 1 110 and corresponds to a block of data identified as shared memory line A 152 that resides in the shared memory 150. The cached line C 120 is similarly stored in cache 1 116 of CPU 1 110 and corresponds to a different block of data identified as shared memory line C 156 that resides in the shared memory 150. In this basic example, the processor 1 112 performs processing that accesses the data contained in the shared memory line A 152 and shared memory line C 156, thereby causing copies of that shared data to be retrieved into the local cache of CPU 1 110 to support that processing. Local cache memory of various CPUs is generally able to store many lines of data. However, local cache memory is generally able to store a subset of shared data that is less than all of the shared data stored in shared memory 150.

In the illustrated example of FIG. 1, CPU 2 130 is shown to have its own cache, cache 2 136 that contains one line, cached line B 138 that corresponds to shared memory line B 154 in shared memory 150. Other CPUs, such as CPU N 140, each have their own local cache memory that contains copies of shared data stored in shared memory 150 that the processor of that CPU is accessing to perform its processing. The individual CPUs operate on data stored in their local caches and initially store their processing results into the local cache prior to writing those results out to the shared memory 150.

In one example of the present method, when a particular processor wishes to obtain a line from shared memory 150 for the purposes of modifying that data, a corresponding indication of the possible modification of that data is communicated to the other processors. In one embodiment, each CPU maintains a flag, referred to as a Cross Interrogate (XI) flag, that indicates if the shared data in shared memory 150 that corresponds to data stored in the local cache of that CPU has been modified by another processor. For example, CPU 1 110 has a XI Flag 1 114 and CPU 2 130 has an XI Flag 2 134. This flag is used by processing performed by the processors of these CPUs to conditionally control execution of processing using data stored in that CPU's local cache, as is described in further detail below. In one example, an XI flag is set in response to the receipt by its associated CPU of a Cross-Interrogate (XI) event signal indicating that data stored in the local cache of that CPU has been modified, as is described in further detail below.

Figure 2:
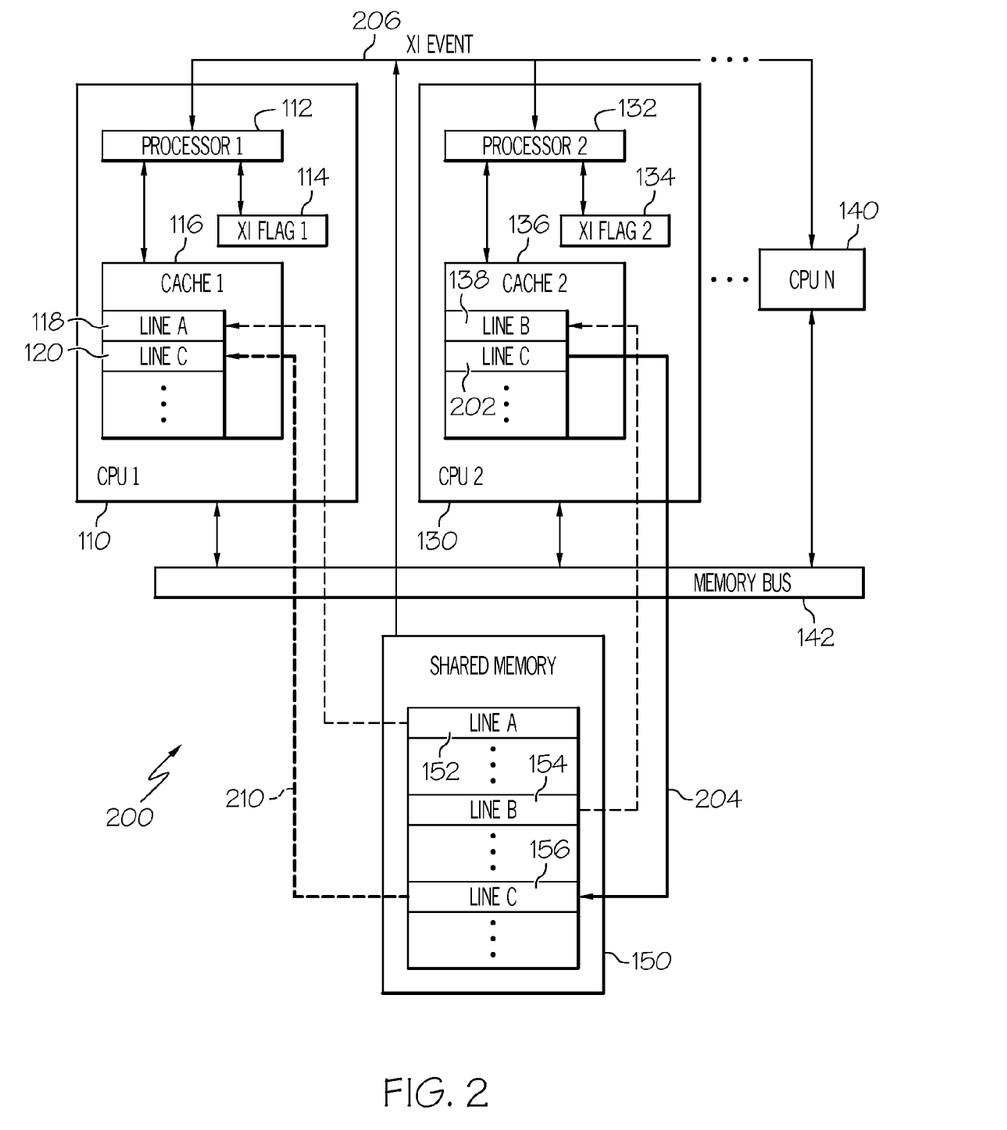
FIG. 2 illustrates a cache line data invalidation operation, in accordance with one embodiment.

FIG. 2 illustrates a cache line data invalidation operation 200, in accordance with one embodiment of the present invention. The cache line data invalidation operation 200 illustrates a modification to the state of the shared memory multiple processor system 100 discussed above with regards to FIG. 1. In the cache line data invalidation operation 200, processor 2 132 of CPU 2 130 creates and is preparing to store a new value 204 to be written into shared memory line C 156 of shared memory 150. In this operation, processor 2 132 writes the new value into a second processor cached line C 202, causing the corresponding data in shared memory line C 156 to be updated in the shared memory 150. In response to that update, the shared memory 150 sends to the other processors a cross-interrogate (XI) event signal indicating that the shared memory corresponding to shared memory line C 156 is modified. Cross interrogate (XI) events, as is understood by practitioners of ordinary skill in the relevant arts in light of the present discussion, are used to manage shared memory systems and coordinate shared data use and updating. In addition to conventional processing of cross interrogate event signals, additional processing is performed to indicate the invalidation of data in a CPU's local cache to an executing sequence of processing instructions. Processors that receive a cross interrogate event signal that indicates that data in its local cache has changed handle that received cross interrogate event by performing processing to accommodate the invalidation of data in the memory locations indicated by the received cross interrogate event signal. In various examples, a processor receiving a cross interrogate event indicating that any data stored in its local cache has been modified by a second or remote processor responds by, for example, setting its XI flag. In yet further examples, more particularized determinations are made to determine if the received cross interrogate event indicates the invalidation of data in a CPU's local cache that is being accessed by an executing sequence of processing instructions As processor 2 132 proceeds to write the new value 204 of shared memory line C 156 into shared memory 150, the shared memory 150 transmits a cross-interrogate event, indicated as an XI Event 206, to all of the CPUs in the shared memory multiple processor system 100. Processor 2 132 modifies the value stored in the local cache 2 136 of data corresponding to shared memory line C 156, thereby causing the data values in shared memory line C 156 to be updated to the new value 204. Once the new data is updated in the shared memory 150, processors accessing that data, such as processor 1 112, will copy the updated value 210 into its local cache. In the illustrated example, the updated values 210 of shared memory line C 156 are copied into cache 1 116 of CPU 1 110 when CPU 1 110 accesses data stored in shared memory line C 156.

In the illustrated example, processor 1 112 is using the value of data stored in shared memory line C 156 to support its processing. In this example, processor 1 112 determines that the received cross interrogate (XI) event indicates a modification by another processor of data corresponding to data stored in local cache 1 118 of CPU 1. An XI Event 206 that specifies a change to data stored in the local cache of a CPU causes that CPU to set its local XI Flag. In the illustrated example, an XI Event 206 received by CPU 1 110 indicates a modification of shared data corresponding to data stored within cache 1 116, i.e., a change in shared data stored in shared memory line C 156 that corresponds to data stored in cached line C 120. Because the XI Event 206 indicates that data corresponding to data stored in the local cache of CPU 1 is being modified, CPU 1 110 sets the state of the XI flag 1 114 to be "set." As described in further detail below, processor 1 112 of CPU 1 110 performs processing in response to the XI Flag 1 114 being in the set state.

Figure 3:
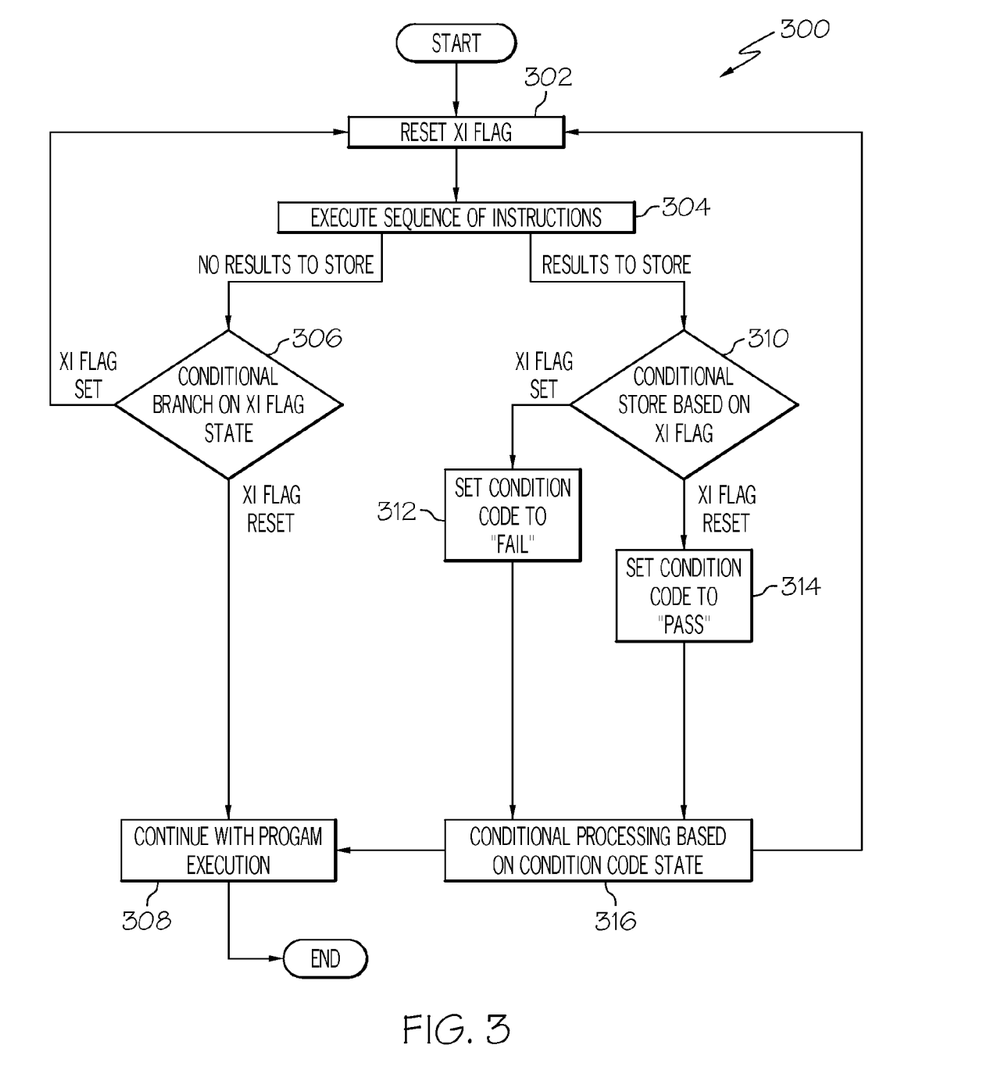
FIG. 3 illustrates a shared data memory instruction sequence execution process, in accordance with one embodiment.

FIG. 3 illustrates a shared data memory instruction sequence execution process 300, in accordance with one embodiment of the present invention. The shared data memory instruction sequence execution process 300 is performed in a multiple processor computing architecture that allows one processor to execute a sequence of program instructions that access data in a shared memory while efficiently monitoring and handling modifications of the accessed shared data by another processor.

In one embodiment, the processing begins by resetting, at 302, a flag maintained by the processor, such as the XI flags discussed above, that indicates receipt of a signal associated with an occurrence of a cross interrogate (XI) event. In an example, the XI flag is placed into a first, or "reset," state. The processing continues by executing, at 304, a sequence of program instructions. In one embodiment, the pre-defined sequence of program instructions are executed by, for example, processor 1 112 of CPU 1 110. The executed sequence of program instructions includes instructions that access selected data elements stored in shared memory 150 that is accessed by multiple processors. As described above, accessing selected data elements stored in shared memory causes a subset of the shared data that contains the selected elements to be stored in the local cache of the processor.

As described above, a cross-interrogate signal, indicating an XI event 206, is a signal that is able to be received at anytime by processor 1 112. The received cross-interrogate signal is also a signal that is able to indicate modification by another processor of shared data corresponding to data stored in local cache 1 118 and used by processor 1 112. Receipt of an XI event 206 signal indicating data in the local cache is being modified therefore indicates that the cached data has become invalid. Processor 112 of one embodiment maintains an XI flag 114 and sets it to a second, or "set," state in response to the receipt of an XI event 206 signal that indicates that the subset of shared data corresponding to data within cache 1 116 is being modified.

Subsequent to the execution of the sequence of program instructions, a control is output to select either a first program processing or a second program processing based upon the current state of the XI flag 114. The control is able to consist of, for example, an output of a flag testing circuit within the processor that causes either a conditional program execution branch or a conditional data storage operation to store results produced by the sequence of program instructions.

In one embodiment, the sequence of program instructions does not contain instructions that cause data to be stored into the shared memory 150. In the case of a sequence of program instructions does not change values of data stored in shared memory 150, the processing continues by performing, at 306, a conditional program execution branch to select execution of either a first program processing or a second program processing based upon the state of the XI flag. If the XI flag is in the "set" state, the data accessed by the executed sequence of instructions may have been modified during the execution of that sequence, and the performed processing may have been invalid. If the XI flag is in the set state, the processing returns to reset, at 302, the IX flag and re-execute the sequence of instructions. Further embodiments are able to conditionally branch to other program code in response to the XI flag being in the "set" state. The output of the XI flag testing circuits in one embodiment operates as a control to select execution. If the XI flag is in the "reset" state, the execution of the sequence of program instructions was not affected by modification of its input data and the processing continues, at 308, with the program. The processing then ends.

In a case where the sequence of program instructions does contain instructions that commit data to be changed in the shared memory 150, the processing continues by performing, at 310, a conditional data store operation based upon the state of the XI flag to store the results of the sequence of instructions. If the XI flag is in the "set" state, the data accessed by the executed sequence of instructions may have been modified during the execution of that sequence, and the performed processing and the result produced thereby may be invalid. If the XI flag is in the "set" state, the conditional store operation does not store the result data and instead discards the results data. If the XI flag is in the "reset" state, the results data are valid and are the conditional store operation stores the results data into the shared memory 150.

One example uses a conditional data store operation that writes multiple bytes of data representing the results of the sequence of program instructions to the local cache with a machine language processor instruction that writes all of the multiple bytes of data in a single memory access operation. This instruction that writes the multiple result bytes is able to be a conditional move data instruction, as discussed above. Writing these multiple bytes with one instruction ensures that all of the bytes in the result are written without modification of some of those bytes by, for example, another process. In an example, the single memory access operation writes a complete line of cache data into the local cache of the executing processor.

If the XI flag is in the "set" state, the processing continues to set, at 312, a condition code to a "fail" state indicating that the results were not stored. If the XI flag is in the "reset" state, the processing continues to set, at 314, the condition code to a "pass" state indicating that the results were stored. The processing then continues to perform, at 316, conditional processing based on the state of the condition code. In one example, the conditional processing responds to the condition code being in the "fail" state by returning to reset, at 302, the XI Flag and re-execute the sequence of instructions, at 304. In an example, the conditional processing responds to the condition code being in the "pass" state by continuing, at 308, with program execution. The conditional processing performed at 316 is also able to perform other processing based upon the state of the condition code set by the conditional store instruction executed at 310.

Various embodiments determine with different particularity if a received XI event indicates that the modified shared data corresponds to data that is being used by the currently executing sequence of program instructions. Some embodiments set the XI flag in response to any XI event that indicates modification of shared data corresponding to any data contained in the local cache of that CPU. Further embodiments, however, perform more particularized processing to determine if the shared data being modified is actually being used by the executing sequence of program instructions. For example, multiple XI flags are able to be maintained that respectively correspond to different portions of storage space. In an example, XI flags are able to indicate modification of individual cache lines within a local cache.

Figure 4:
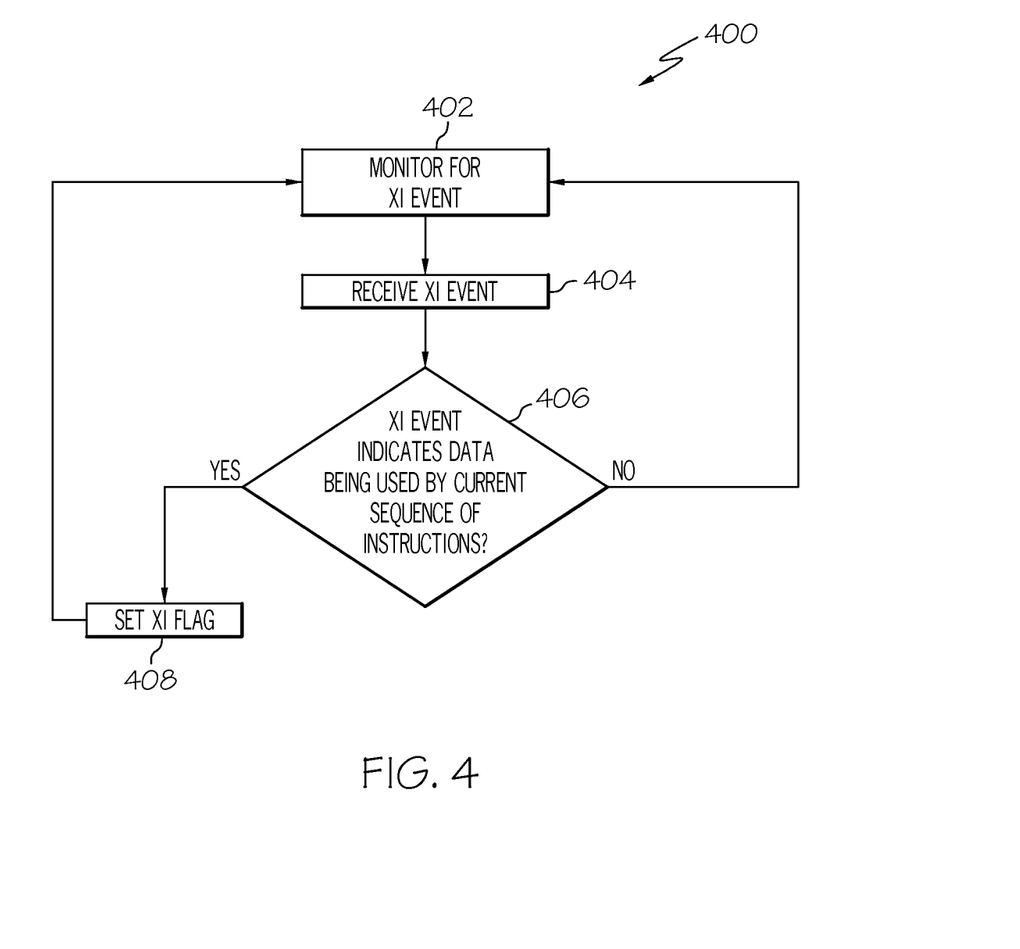
FIG. 4 illustrates a monitor cross-interrogate event signal process, in accordance with one embodiment.

FIG. 4 illustrates a monitor cross-interrogate (XI) event signal process 400, in accordance with one example of the present method. The monitor XI event process 400 is performed to more particularly determine if shared memory data affected by a shared memory update associated with a Cross-Interrogate (XI) event corresponds to data being accessed by a currently executing sequence of instructions. The monitor XI event process 400 is performed in response to the receipt of an XI event by a processor in a multiple processor architecture computing system.

The monitor XI event process 400 begins by monitoring, at 402, for the receipt of an XI event by the processor performing the monitor XI event process 400. An XI event is received, at 404, by the processor. A determination is made, at 406, if the XI event query data corresponds to data being used by a currently executing sequence of program instructions.

Various embodiments are able to determine that the XI event indicates that the XI data being modified corresponds to data being used by the currently executing sequence of program instruction. In one example, the shared data memory instruction sequence execution process 300, discussed above, stores memory ranges that are accessed by the sequence of program instructions into a table. The memory locations indicated in a received XI event are then compared to the memory ranges stored in that table to determine if shared memory locations of interest are being modified and thereby affecting the sequence of program instructions currently being executed. In further examples, a determination that the data being modified corresponds to data being used by the currently executing sequence of program instructions include determining that the memory locations indicated in a received XI event correspond to data stored in the local cache of the processor receiving the XI event.

If the XI event query data does not correspond to data being accessed by the currently executing sequence of program instructions, the processing being performed by the current sequence of program instructions is not affected by the received XI event and the XI flag does not have to be set. In that case, the processing returns to monitor, at 402, for receipt of XI events.

If the XI event query data does correspond to data being used by the currently executing sequence of program instructions, the validity of the processing being performed by the current sequence of program instructions may be affected by the modified data and the XI flag is set, at 408. The processing then returns to monitor, at 402, for receipt of XI events.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
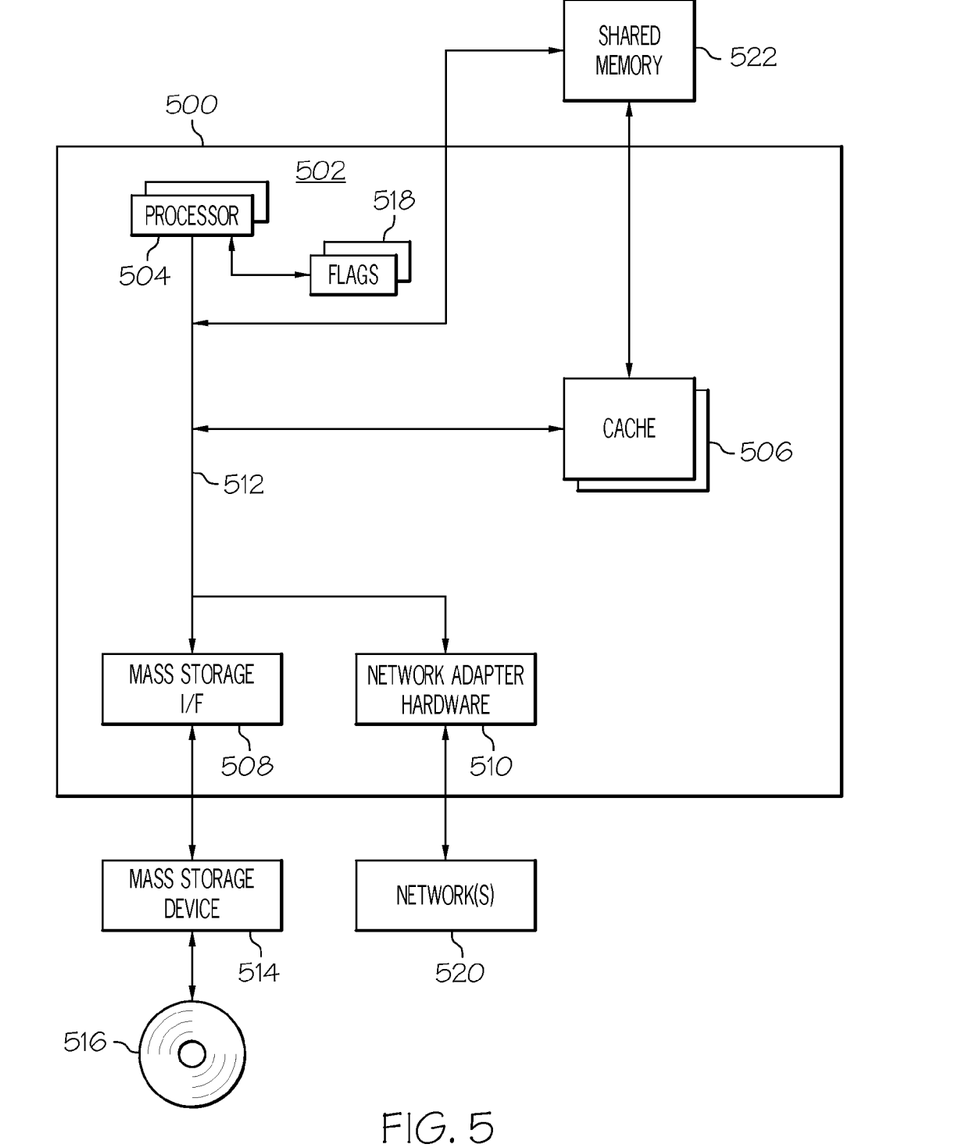
FIG. 5 is a block diagram of an information processing system that can be utilized within the shared memory multiple processor system depicted in FIGS. 1 and 2.

Referring now to FIG. 5, which is a block diagram illustrating an information processing system 500 that can be utilized within the shared memory multiple processor system 100 discussed above with respect to FIGS. 1 and 2. The information processing system 500 is based upon a suitably configured processing system adapted to implement one or more embodiments of the present invention. Similarly, any suitably configured processing system can be used as the information processing system 500 by embodiments of the present invention.

The information processing system 500 includes a computer 502. The computer 502 has a plurality of processors 504 that are each connected to a respective cache memory 506 and respective set of flags 518. Processors 504 are also connected to a shared memory 522, a mass storage interface 508, and network adapter hardware 510. A system bus 512 interconnects these system components.

The mass storage interface 508 is used to connect mass storage devices, such as data storage device 514, to the information processing system 500. One specific type of data storage device is an optical drive such as a CD/DVD drive, which may be used to store data to and read data from a computer readable medium or storage product such as (but not limited to) a CD/DVD 516. Another type of data storage device is a data storage device configured to support, for example, NTFS type file system operations.

An operating system (not shown) included in the memory 522 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 500. The network adapter hardware 510 in one embodiment provides network communications interfaces to one or more networks 520. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for performing a sequence of memory access operations on a processor accessing shared data within a multiple processor system, the method comprising:
    performing the following with a processor:
        setting a single flag associated with the processor into a first state;
        executing, by a first processor subsequent to the setting the single flag, a sequence of program instructions comprising at least one instruction accessing selected data elements within a local cache of the first processor, the local cache storing a subset of shared data accessed by multiple processors;
        receiving, at the first processor, a signal indicating a modification of data corresponding to data stored within the local cache, the signal indicating any modification to any storage location within a plurality of storage locations in the local cache of the first processor;
        based on receiving the signal indicating any modification to any storage location within a plurality of storage locations, setting, during the executing, the single flag into a second state, the second state of the single flag indicating the modification to any storage location within the plurality of storage locations in the local cache of the first processor; and
        subsequent to the executing the sequence of program instructions and based on the single flag being in the first state, outputting a control to select execution of a first program.

2. The method of claim 1, further comprising:
    determining that the modification comprises a modification of data corresponding to a single line of local cache maintained by the first processor, and
    the setting the single flag into the second state being further based on the determining that the modification comprises a modification of data corresponding to a single line of local cache maintained by the first processor.

3. The method of claim 2, further comprising:
    determining that the single line of local cache stores at least some of the selected data elements, and
    the setting the single flag into the second state being further based on the determining that the single line of local cache stores at least some of the selected data elements.

4. The method of claim 1, wherein the signal comprises a cross-interrogate signal, sent from a shared memory storing the shared data, indicating access to shared data corresponding to data stored within the local cache of the first processor.

5. The method of claim 1, further comprising:
    storing, by the first program, results data produced by the sequence of program instructions into the local cache of the first processor; and
    discarding, based on the single flag being in the second state, the results data produced by the sequence of program instructions.

6. The method of claim 5, the results data comprising a plurality of data elements, the storing the results data comprising storing all of the plurality of data elements into the local cache of the first processor with a single memory access operation.

7. The method of claim 6, the storing all of the plurality of data elements comprising executing an instruction that writes a complete line of cache data into the local cache of the first processor.

8. A central processing unit within a multiple processor system sharing a shared memory and performing a sequence of memory access operations, the central processing unit comprising:

a single processor status flag associated with the central processing unit, the single processor status flag settable between a first state and a second state;

a local cache for storing a subset of shared data accessed by multiple processors;

a processor configured to:

set the single processor status flag into the first state;

execute, subsequently to the setting the single processor status flag, a sequence of program instructions comprising at least one instruction accessing selected data elements within the local cache;

receive a signal indicating a modification of data corresponding to data stored within the local cache, the signal indicating any modification to any storage location within a plurality of storage locations in the local cache;

based on receiving the signal indicating any modification to any storage location within a plurality of storage locations, set, during the executing, the single processor status flag into a second state, the second state of the single flag indicating the modification to any storage location within the plurality of storage locations in the local cache; and subsequent to execution of the sequence of program instructions and based on the single processor status flag being in the first state, output a control to select execution of a first program.

9. The central processing unit of claim 8, the processor further configured to determine that the modification of data comprises modification of data corresponding to a single line of local cache, and wherein the processor is further configured to set the single processor status flag into the second state based on the determining that the modification comprises a modification of data corresponding to a single line of local cache.

10. The central processing unit of claim 8, wherein the signal comprises a cross-interrogate signal, sent from a shared memory storing the shared data, indicating access to shared data corresponding to data stored within the local cache.

11. The central processing unit of claim 8, the first program processing comprising storing results data produced by the sequence of program instructions into the local cache.

12. The central processing unit of claim 11, the processor further configured to execute, based on the single processor status flag being in the second state, a second program processing comprising discarding the results data produced by the sequence of program instructions.

13. The central processing unit of claim 11, wherein the results data comprises a plurality of data elements, and wherein the processor is further configured to store the results data by storing all of the plurality of data elements into the local cache with a single memory access operation.

14. The central processing unit of claim 13, wherein the storing all of the plurality of data elements comprises executing an instruction that writes a complete line of cache data into the local cache.

15. A computer program product for performing a sequence of memory access operations on a processor sharing a shared memory system within a multiple processor system, the computer program product comprising:

a non-transient computer readable storage medium having computer readable program code embodied therewith, the computer readable program code comprising:

computer readable program code configured to set a single flag associated with the processor into a first state;

computer readable program code configured to execute, by a first processor subsequent to the setting the single flag, a sequence of program instructions comprising at least one instruction accessing selected data elements within a local cache of the first processor, the local cache storing a subset of shared data accessed by multiple processors;

computer readable program code configured to receive, by the first processor, a signal indicating a modification of data corresponding to data stored within the local cache, the signal indicating any modification to any storage location within a plurality of storage locations in the local cache of the first processor;

computer readable program code configured to, based on receiving the signal indicating any modification to any storage location within a plurality of storage locations, setting, during execution of the sequence of program instructions comprising at least one instruction accessing selected data elements within a local cache of the first processor, the single flag into a second state, the second state of the single flag indicating the modification to any storage location within the plurality of storage locations in the local cache of the first processor; and computer readable program code configured to, subsequent to the executing the sequence of program instructions and based on the single flag being in the first state, output a control to select execution of a first program.

16. The computer program product of claim 15, the computer readable program code further comprising:

computer readable program code configured to determine that the modification comprises a modification of data corresponding to a single line of local cache maintained by the first processor.

17. The computer program product of claim 15, wherein the signal comprises a cross-interrogate signal, sent from a shared memory storing the shared data, indicating access to shared data corresponding to data stored within the local cache of the first processor.

18. The computer program product of claim 15, the first program processing comprising storing results data produced by the sequence of program instructions into the local cache of the first processor.

19. The computer program product of claim 18, the results data comprising a plurality of data elements, the storing the results data comprising storing all of the plurality of data elements into the local cache of the first processor with a single memory access operation.

20. The computer program product of claim 18, further comprising computer readable program code configured to, subsequent to the executing the sequence of program instructions and based on the single flag being in the second state, execute a second program processing comprising discarding the results data produced by the sequence of program instructions.

* * * * *